US012779847B2

(12) United States Patent
Murakami

(10) Patent No.: US 12,779,847 B2
(45) Date of Patent: Nov. 3, 2026

(54) PRINTING APPARATUS AND PRINTING METHOD

(71) Applicant: SEIKO EPSON CORPORATION, Tokyo (JP)

(72) Inventor: Shunsuke Murakami, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 101 days.

(21) Appl. No.: 19/025,003

(22) Filed: Jan. 16, 2025

(65) Prior Publication Data

US 2025/0236107 A1 Jul. 24, 2025

(30) Foreign Application Priority Data

Jan. 19, 2024 (JP) ................................ 2024-006497

(51) Int. Cl.

*B41J 2/045* (2006.01)
*B41J 2/15* (2006.01)
*B41J 3/407* (2006.01)
*B41J 11/00* (2006.01)

(52) U.S. Cl.

CPC ....... *B41J 2/04573* (2013.01); *B41J 2/04553* (2013.01); *B41J 2/04586* (2013.01); *B41J 2/15* (2013.01); *B41J 3/4078* (2013.01); *B41J 11/007* (2013.01)

(58) Field of Classification Search

CPC .. B41J 2/04573; B41J 2/0454; B41J 2/04553; B41J 2002/16591; B41J 11/007; B41J 15/048

See application file for complete search history.

(56) References Cited

U.S. PATENT DOCUMENTS

| | | | | |
|---|---|---|---|---|
| 2014/0146101 A1* | 5/2014 | Sakurada | ............. | B41J 2/04503 347/10 |
| 2021/0001623 A1* | 1/2021 | Kaburagi | ............. | B41J 2/04558 |
| 2021/0300039 A1* | 9/2021 | Kobayashi | ........... | B41J 2/14201 |

FOREIGN PATENT DOCUMENTS

| | | |
|---|---|---|
| JP | 2001-199108 A | 7/2001 |
| JP | 2021-126779 A | 9/2021 |

* cited by examiner

*Primary Examiner* — Scott A Richmond
(74) *Attorney, Agent, or Firm* — WORKMAN NYDEGGER

(57) ABSTRACT

A printing apparatus including a transport unit including a transporting belt formed with an adhesive layer on a surface thereof and configured to support a medium at the adhesive layer to transport the medium, a recording unit configured to perform recording by ejecting ink onto the medium supported by the transport unit, a heating unit configured to heat the transport unit, and a control unit configured to control the transport unit and the recording unit, wherein the control unit acquires temperature information of the transporting belt, and based on the acquired temperature information, corrects at least one of a timing at which the recording unit ejects the ink or an ejection speed. By correcting the ejection timing of the recording unit that ejects the ink based on the temperature information of the transporting belt, it is possible to start printing without waiting for a PG change due to thermal expansion of the transporting belt due to heating to become stable.

9 Claims, 7 Drawing Sheets

PRINTING APPARATUS AND PRINTING METHOD

The present application is based on, and claims priority from JP Application Serial Number 2024-006497, filed Jan. 19, 2024, the disclosure of which is hereby incorporated by reference herein in its entirety.

BACKGROUND

1. Technical Field

The present disclosure relates to a printing apparatus and a printing method, and more particularly to a printing apparatus in which a medium is supported and transported by an adhesive layer, and a printing method.

2. Related Art

There is known an image forming apparatus that, in textile printing in which printing is performed on fabric, includes a transporting belt having a surface coated with an adhesive, and transports the fabric while the fabric is temporarily bonded to the transporting belt.

Further, in an image forming apparatus disclosed in JP 2021-126779 A, when adhesion of an adhesive material is improved by heating a transporting belt at a heating unit, a temperature of the transporting belt is controlled by changing a position of the heating unit in accordance with a driving state of the transporting belt.

In the existing image forming apparatus, heating of the transporting belt is started by the heating unit when printing is started. When the temperature of the transporting belt rises, the transport belt thermally expands and a gap (hereinafter referred to as PG) between the transporting belt and a printing head changes. For this reason, it is necessary to perform printing after waiting until the temperature of the transporting belt becomes stable and the change in PG becomes stable, resulting in downtime.

SUMMARY

The present disclosure is a printing apparatus including a transport unit including a transporting belt formed with an adhesive layer on a surface thereof and configured to support a medium at the adhesive layer to transport the medium, a recording unit configured to perform recording by ejecting ink onto the medium supported by the transport unit, a heating unit configured to heat the transport unit, and a control unit configured to control the transport unit and the recording unit, wherein the control unit is configured to acquire temperature information of the transporting belt, and based on the acquired temperature information, correct at least one of a timing at which the recording unit ejects the ink or an ejection speed.

DESCRIPTION OF EMBODIMENTS

Embodiments of the present disclosure will be described below with reference to the accompanying drawings.

Figure 1:
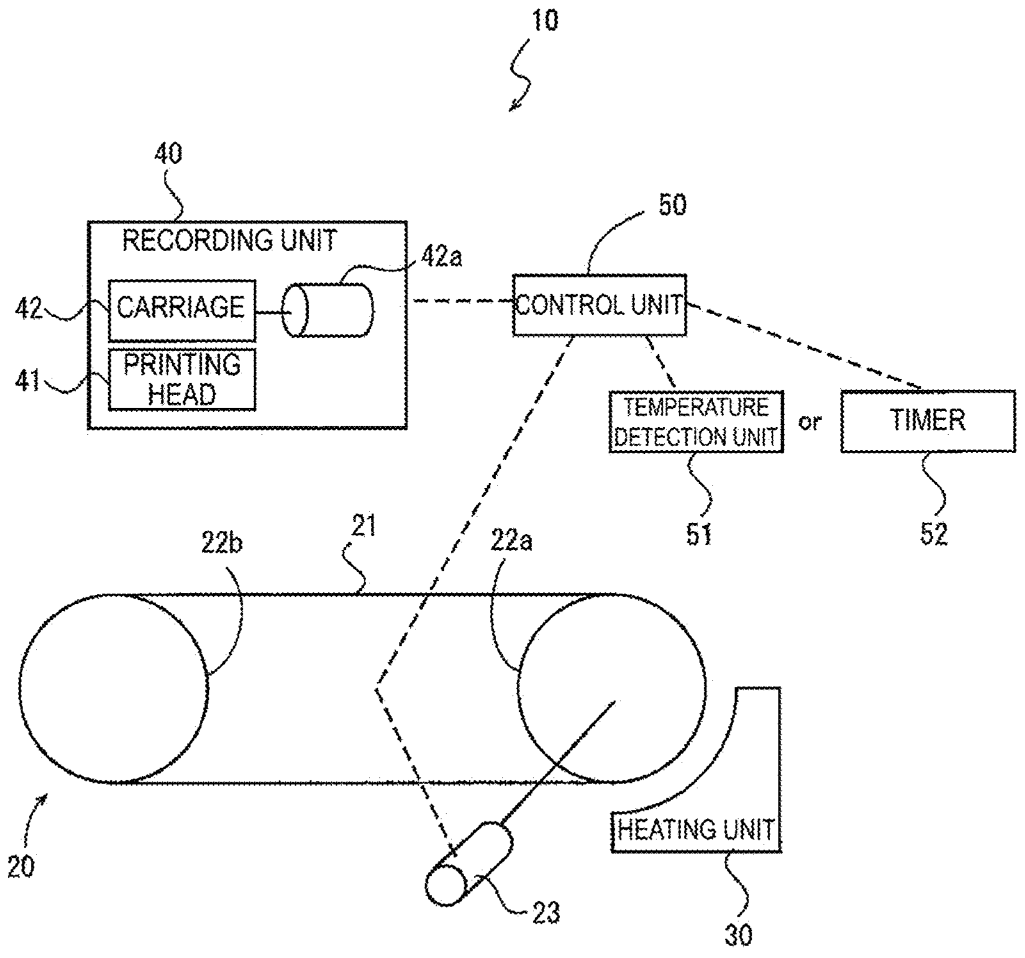
FIG. 1 is a schematic block diagram of a printing apparatus according to an embodiment of the present disclosure.

FIG. 1 illustrates, by a schematic block diagram, a printing apparatus according to an embodiment of the present disclosure. In the drawing, a printing apparatus 10 includes a transport unit 20 having a transporting belt 21. The transporting belt 21 of the transport unit 20 has an adhesive layer at a surface thereof, and supports and transports a cloth as a medium at the adhesive layer. A heating glue adhesive is used for the adhesive layer. The transporting belt 21 is stretched between a pair of rollers 22*a* and 22*b*, and the roller 22*a* on one side is driven by a transport motor 23. A heating unit 30 is installed so as to face a surface of the roller 22*a*. The heating unit 30 radiates radiant heat to the roller 22*a* to heat a surface of the transporting belt 21 that is stretched between the rollers 22*a* and 22*b* and is sequentially driven. Note that the heating unit 30 is separately controlled so that the transporting belt 21 has an appropriate temperature.

A recording unit 40 performs recording by ejecting ink onto the cloth which is the medium supported by the transporting belt 21 of the transport unit 20. The recording unit 40 includes a printing head 41, a carriage 42 that reciprocates in a direction orthogonal to a driving direction of the transporting belt 21 while supporting the printing head 41, and a carriage motor 42*a* that reciprocates the carriage 42.

In this way, the recording unit 40 performs recording by moving the printing head 41 in a direction intersecting a transport direction of the medium, specifically, in a direction orthogonal to the transport direction. Further, the recording unit 40 performs recording by reciprocating the printing head 41 in a direction intersecting the transport direction of the medium.

The control unit 50 controls the transport unit 20 and the recording unit 40. To be more specific, the control unit 50 controls the transport motor 23 of the transport unit 20 to drive the cloth being the medium in a predetermined direction, controls the carriage motor 42*a* for each printing pass to reciprocate the printing head 41 in the direction orthogonal to the transport direction of the cloth, and causes an ink droplet to be ejected from the printing head 41 at predetermined timing based on PG, a speed of the carriage 42, and a predetermined ink droplet speed. The ink droplet reaches the cloth being the medium through a predetermined path to form a predetermined pattern.

Further, the control unit 50 includes a temperature detection unit 51 for detecting a temperature of the transporting belt 21, and a timer 52 capable of measuring a predetermined elapsed time. Note that it is not necessary for both the temperature detection unit 51 and the timer 52 to be included, and it may also be possible that only one of them is included.

Figure 2:
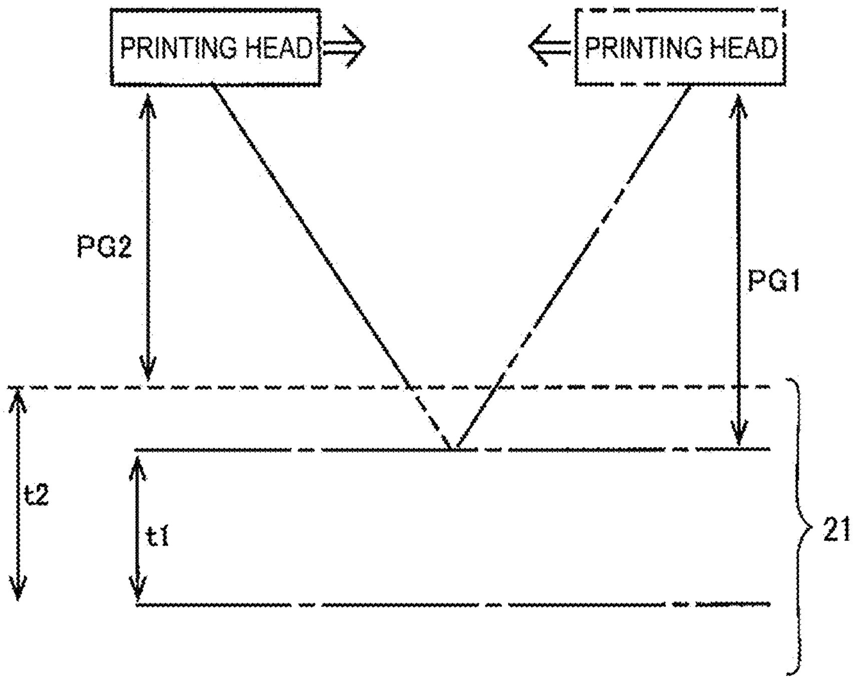
FIG. 2 is a schematic diagram of ejection paths of ink droplets.

FIG. 2 illustrates, by a schematic diagram, ejection paths of ink droplets.

A method in which printing is performed by repeating movement of the printing head 41 in the direction orthogonal to the transport direction of the medium for each printing pass and subsequent transport of the medium by a predetermined distance is referred to as a serial method. The serial method makes it possible to increase a printing speed by reciprocating the printing head 41, and is called bidirectional printing or a BiD method. On the other hand, a method in which printing is performed only when the printing head 41 is driven in one direction is referred to as unidirectional printing or UniD method.

FIG. 2 also illustrates the transporting belt 21. Since the transporting belt 21 is heated by the heating unit 30, a thickness t2 at a heated time after a predetermined time has elapsed is greater than a thickness t1 at a cool time before printing. When the thickness of the transporting belt 21 changes, a distance PG from a surface of the cloth which is the medium supported at the surface of the transporting belt 21, to the printing head 41 changes. To be more specific, the distance is PG1 at the cool time but is PG2 at the heated time.

Since the printing head 41 is driven at a predetermined speed by the carriage 42, an ink droplet ejected from the printing head 41 moves obliquely as illustrated in FIG. 2 to reach the surface of the cloth. When PG changes, a landing position also changes. When PG is decreased, an image forming position is shifted backward as compared with a case where PG is large. In the case of unidirectional printing, even when PG changes and the landing position is shifted, only the image forming position is shifted in a predetermined direction, and a formed image does not change. In other words, when PG is large at the cool time, a shift to a forward direction side occurs.

On the other hand, in the case of bidirectional printing, an image forming position is shifted to a backward side as PG is decreased with reference to a moving direction of the carriage 42, thus an image forming position in a forward path and an image forming position in a backward path become different from each other, and an image to be formed by printing in the forward path and the backward path cannot be correctly formed. In order to avoid such a situation, the printing waits until the transporting belt 21 is sufficiently heated to have the thickness t2 when the transporting belt is heated and the distance between the printing head 41 and the medium becomes PG2.

Figure 3:
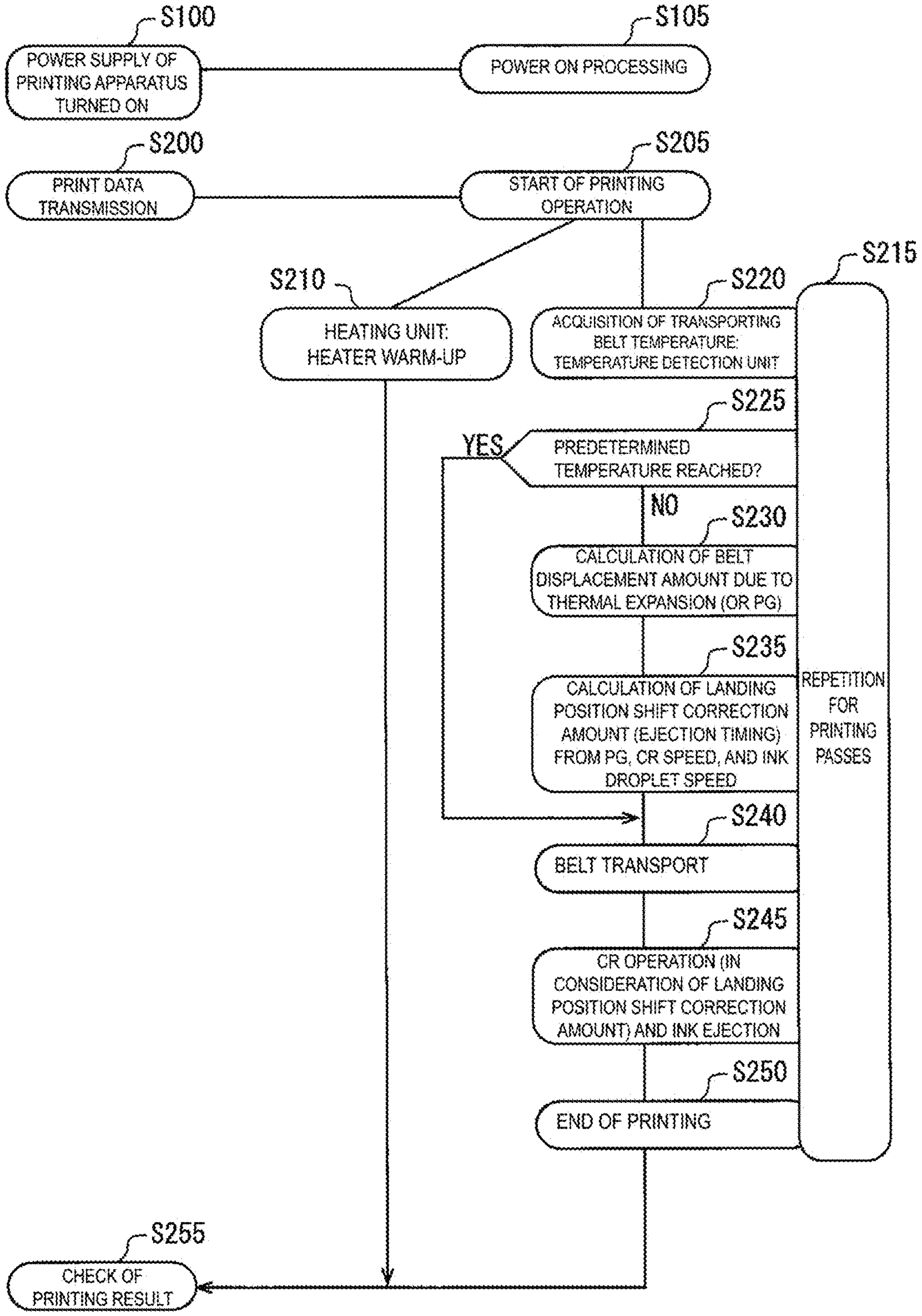
FIG. 3 is a flowchart of a program executed by a control unit.
Figure 4:
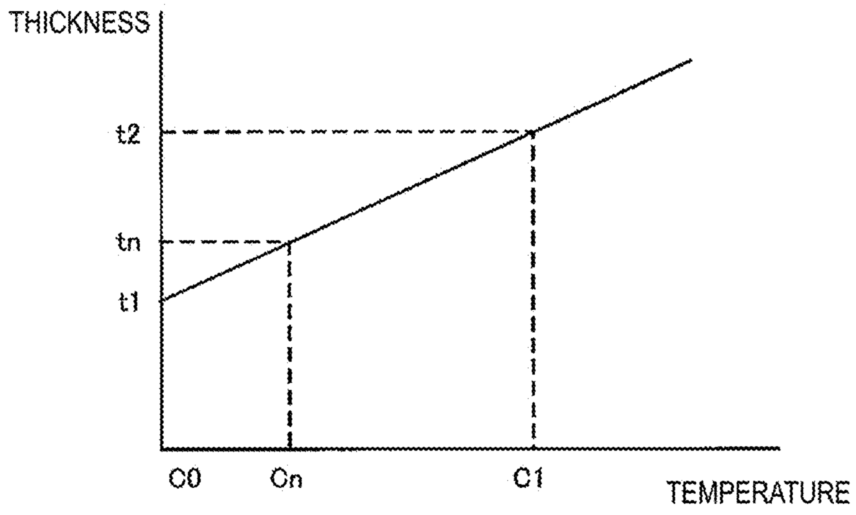
FIG. 4 is a graph showing a relationship between temperature and thickness of a transporting belt.

FIG. 3 is a flowchart of a program to be executed, and FIG. 4 shows, by a graph, a relationship between the temperature and the thickness of the transporting belt.

First, the thickness and the temperature of the transporting belt are substantially proportional to each other, and thus when temperature information is acquired, the thickness can be calculated by multiplication by a predetermined coefficient.

When a power supply of the printing apparatus 10 is turned on in step S100 as an operation by a user, the control unit 50 executes a power ON processing in the printing apparatus 10 in step S105. This is processing at an initial stage of activation, and executes a processing of clearing a memory and a register and waiting for a next operation by the user. Thereafter, the user can perform a print processing from another device or the like connected to a network. In addition, the cloth or the like which is a printing medium is set at the transporting belt 21 of the transport unit 20 to prepare for printing beforehand.

When the user performs a print operation from the other device in step S200, the device transmits print data to the printing apparatus 10. In step S205, the printing apparatus 10 starts printing operation. First, in S210, the heating unit 30 starts heating. This is called heater warm-up. In the past, after that, it was necessary to wait for a predetermined time until the transporting belt 21 is sufficiently warmed.

However, after the printing operation is started, the control unit 50 does not wait and repeats the next processing for the number of printing passes in step S215. That is, the printing head 41 is caused to perform printing for the number of printing passes, and to complete the printing.

In each of the printing passes, first, a temperature of the transporting belt 21 is acquired in step S220. Specifically, the control unit 50 acquires current temperature information of the transporting belt 21 detected by the temperature detection unit 51. In step S225, the control unit 50 determines whether the acquired temperature of the transporting belt 21 has reached a predetermined temperature or not, and when the acquired temperature has not reached the predetermined temperature, the control unit 50 calculates a belt displacement amount due to thermal expansion (or PG) in step S230. As illustrated in FIG. 4, since the proportional relationship is established between the temperature and the transporting belt 21, a thickness tn corresponding to a temperature Cn detected at the temperature detection unit 51 can be calculated. Thereafter, in step S235, the control unit 50 calculates a landing position shift correction amount (ejection timing) from PG, a CR speed, and an ink droplet speed. Note that in order to eliminate a landing position shift, it is also possible to correct an ejection speed as described later in addition to the ejection timing. In other words, it is sufficient that at least one of the timing at which ink is ejection or the ejection speed is corrected.

Earlier than this, the control unit 50 controls the carriage motor 42*a* to start driving the printing head 41 in a forward path or a backward path. Since the thickness of the transporting belt 21 is increased by a predetermined amount, PG is decreased, and additionally, the CR speed at that time is controlled and grasped by the control unit 50, and the ink droplet speed is also supposed to be a predetermined speed in normal printing by the printing head 41.

For example, when an ink droplet is caused to be ejected at original ejection timing, the thickness of the transporting belt 21 is increased by a predetermined amount, and thus the ink droplet reaches the cloth at a position backward by a predetermined distance corresponding to the increased thickness. Conversely, before the thickness is increased, a shift to the forward direction side by a predetermined distance occurs. For this reason, by causing an ink droplet to be ejected at timing corresponding to a position backward by a predetermined distance, the ink droplet is supposed to land at an original image forming position. The timing calculated by the reverse calculation in this way corresponds to a landing position shift correction amount.

In step S240, when the control unit 50 drives the transport motor 23 (belt transport) for recording in the recording unit 40, the recording unit 40 causes CR operation to be performed and causes ink to be ejected in step S245. At this time, the landing position shift correction amount is considered. Further, the CR operation refers to carriage operation, and represents operation of ejecting an ink droplet from the moving printing head 41 at predetermined ejection timing to perform printing in synchronization with the driving operation of the carriage motor 42*a* and the driving of the transport motor 23 by the control unit 50.

By calculating a correction amount corresponding to appropriate ejection timing according to whether each printing pass is a forward pass or a backward pass, and ejecting an ink droplet in consideration of the correction amount, an image to be formed as a desired image even when printing is started when the transporting belt 21 is not sufficiently heated.

In this way, since printing can be performed without waiting for a change in PG (the gap) between the transporting belt 21 and the printing head 41 to be stabilized by heating by the heating unit 30, it is possible to reduce downtime.

In the above description, step S220 corresponds to a process of acquiring temperature information of the transporting belt, and step S230 corresponds to a process of correcting timing at which the ink is ejected based on the acquired temperature information.

In addition, the control unit 50 repeatedly executes the correction of at least one of the timing at which the ink is ejected or the ejection speed for each printing pass of the printing head 41.

Meanwhile, in step S225, the control unit 50 determines whether the acquired temperature of the transporting belt 21 has reached a predetermined temperature or not, and when the acquired temperature has reached the predetermined temperature, the control unit 50 drives the transport motor 23 in step S240, and causes CR operation to be performed and causes the ink to be ejected in step S245. At this time, since step S235 is not executed, the landing position shift correction amount is not taken into consideration. The reason is that the fact that the predetermined temperature is reached means that the thickness of the transporting belt 21 reaches a thickness expected in advance and thus landing position correction is not necessary. In addition, since it is not necessary to calculate a correction amount, it is possible to reduce a calculation processing amount.

In this way, the control unit 50 repeats the correction of at least one of the timing at which the ink is ejected or the ejection speed, until the temperature of the transport unit 20 reaches the predetermined temperature.

When the repetition for all the printing passes is done, the printing is completed in step S250, and the user checks a printing result in step S255.

Figure 5:
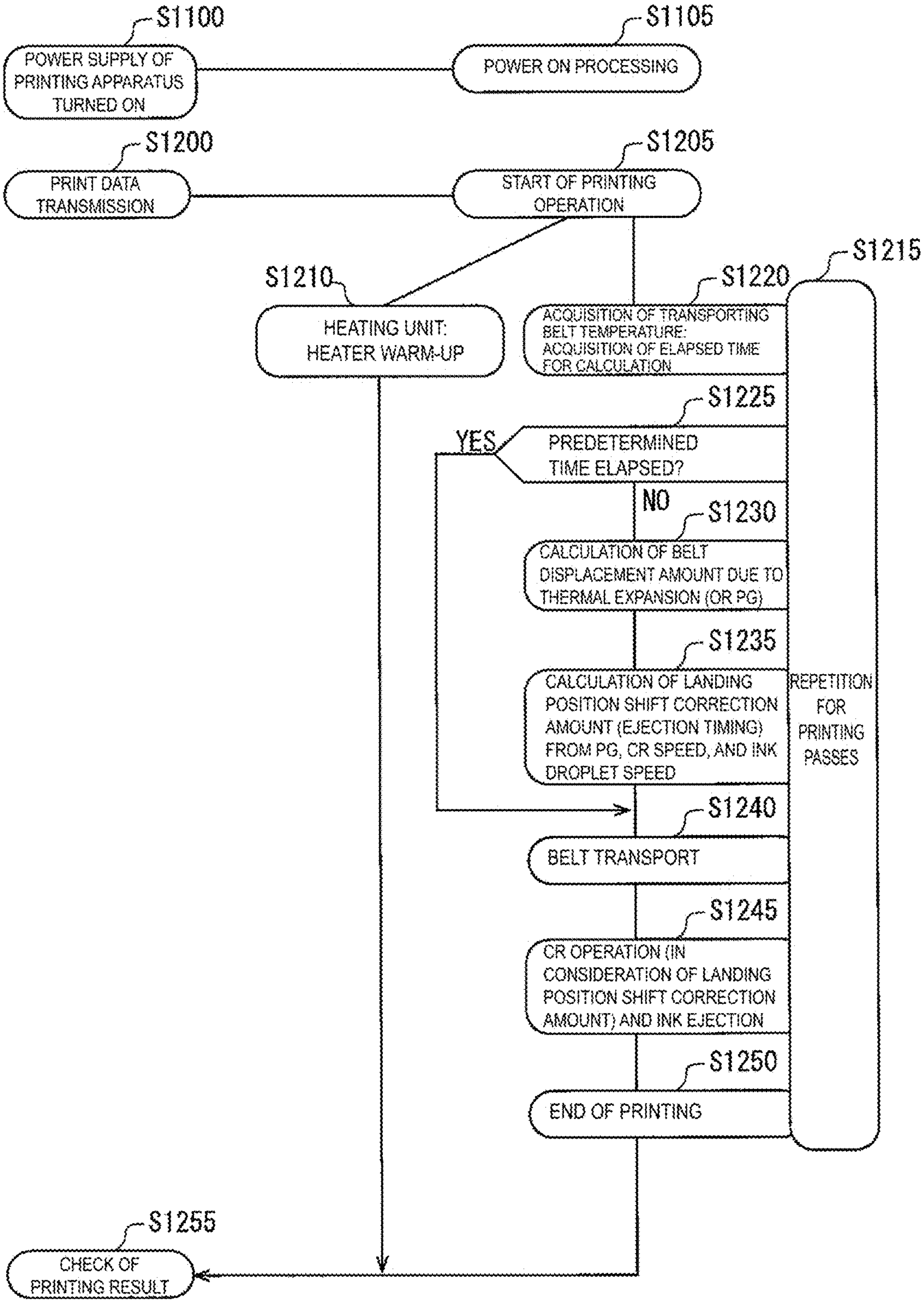
FIG. 5 is a flowchart of a program executed by a control unit according to a modification.
Figure 6:
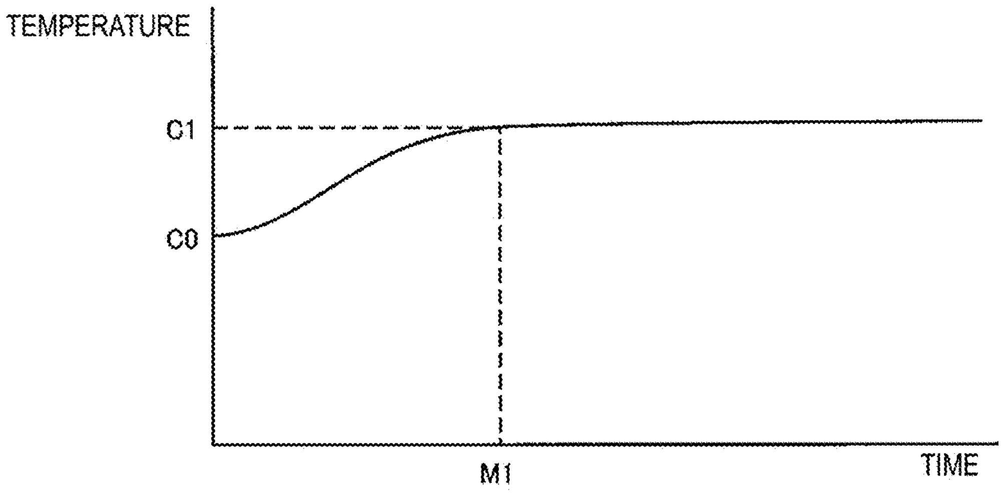
FIG. 6 is a graph showing a temporal change in temperature.

FIG. 5 is a flowchart of a program to be executed according to a modification, and FIG. 6 shows, by a graph, a temporal change in temperature. FIG. 6 shows that the temperature of the transporting belt 21 changes from C0 to C1 during a period from the heater warm-up to a time M1, and thereafter the temperature becomes substantially constant at C1.

In the above-described embodiment, the temperature of the transporting belt 21 is detected by the temperature detection unit 51, and the thickness of the transporting belt 21 is calculated from the temperature. However, as shown in FIG. 6, there is a predetermined correlation between the time from when the power supply of the printing apparatus 10 is turned on and the temperature of the transporting belt 21. Therefore, based on this graph, the temperature can be indirectly estimated from the time. In the embodiment, the timer 52 is included so that a predetermined elapsed time can be measured.

In the flowchart illustrated in FIG. 5 and the flowchart illustrated in FIG. 3, in steps that are the same except for the thousands place, substantially the same processing is executed, and a detailed description thereof will be omitted.

Steps S1220 and S1225 are largely different. In step S1220, the control unit 50 acquires the elapsed time by the timer 52 and acquires a temperature of the transporting belt 21 by calculation based on the graph shown in FIG. 6.

When the user turns on the power supply of the printing apparatus 10 in step S1100, the control unit 50 executes a power ON processing in the printing apparatus 10 in step S1105. When the user transmits print data from another device to the printing apparatus 10 in step S1200, the printing apparatus 10 starts printing operation in step S1205, and starts heater warm-up of the heating unit 30 in step S1210. The timer 52 measures an elapsed time from the heater warm-up.

After the printing operation is started, the control unit 50 repeats the next processing for the number of printing passes in step S1215 without waiting. In each of the printing passes, the temperature of the transporting belt 21 is acquired in step S1220. That is, the control unit 50 acquires the elapsed time by the timer 52 and acquires the temperature of the transporting belt 21 by calculation based on the graph shown in FIG. 6.

Next, in step S1225, the control unit 50 determines whether a predetermined time has elapsed since the power was turned on or not, and when the predetermined elapsed time has not elapsed, calculates, in step S1230, a belt displacement amount due to thermal expansion (or PG) is calculated from the calculated temperature of the transporting belt 21, and a landing position shift correction amount (ejection timing) is calculated, in step S1235, from PG, a CR speed, and an ink droplet speed. As for the calculation of the correction amount, it is possible, not only to acquire the current temperature information of the transporting belt 21 detected by the temperature detection unit 51 in step S220, but also to acquire the temperature of the transporting belt 21 by calculation from the elapsed time from the heater warm-up in step S1220.

As described above, the control unit 50 estimates the temperature of the transporting belt based on the predetermined elapsed time and sets the temperature as the temperature information. In the embodiment, the elapsed time is an elapsed time from a print start time, and specifically, is a start time from the heater warm-up. Although there are various methods for acquiring an elapsed time, print start information may be acquired and a print start time may be acquired, to acquire an elapsed time up to a current time. Further, the timer 52 may be included that constantly performs timing for that purpose.

Thereafter, in step S1240, when the control unit 50 drives the transport motor 23 (belt transport) for recording in the recording unit 40, the recording unit 40 causes, in step S1245, CR operation to be performed and causes ink to be ejected. In the CR operation, an ink droplet is ejected in consideration of a correction amount corresponding to appropriate ejection timing, thus an image to be formed can be obtained as a desired image even when printing is started from when the transporting belt 21 is not sufficiently heated.

When it is determined in step S1225 that the predetermined time has elapsed since the power was turned on, the transport motor 23 is driven in step S1240, and CR operation is caused to be performed in step S1245 and the ink is caused to be ejected. At this time, since step S1235 is not executed, a landing position shift correction amount is not taken into consideration, but an elapse of the predetermined time means that the temperature of the transporting belt 21 has reached the predetermined temperature and the thickness has reached a thickness expected in advance, and therefore, landing position correction is not necessary. Then, since it is not necessary to calculate a correction amount, it is possible to reduce a calculation processing amount.

In this way, the control unit 50 repeats the correction of at least one of the timing at which the ink is ejected or the ejection speed until the elapsed time reaches the predetermined time.

In the embodiment, the step S1220 corresponds to a process of acquiring temperature information of the adhesive layer, and the step S1230 corresponds to a process of correcting the timing at which the ink is ejected based on the acquired temperature information.

Figure 7:
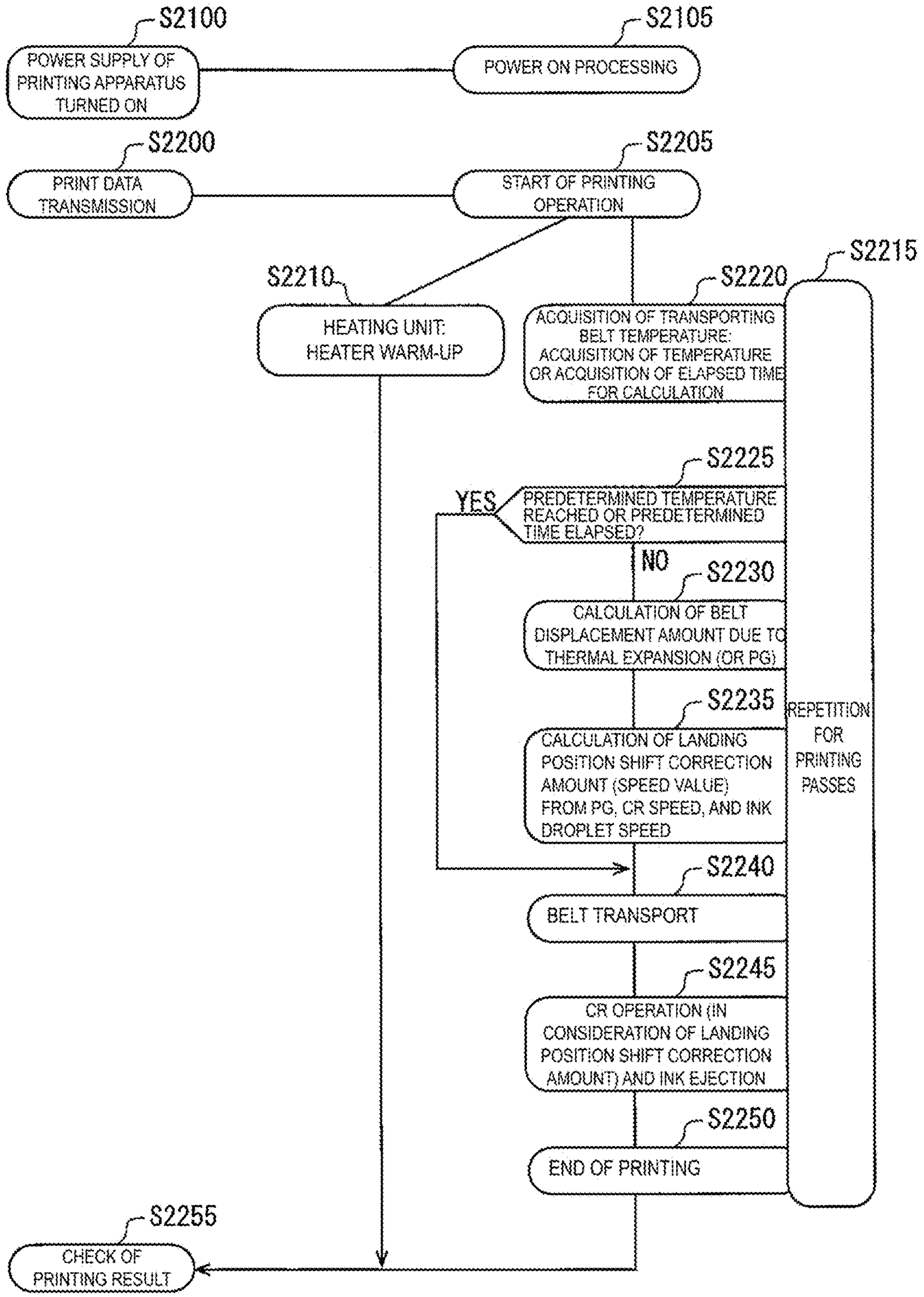
FIG. 7 is a flowchart of a program executed by the control unit according to a modification.

FIG. 7 is a flowchart of a program executed according to a modification.

In the embodiment, in order to eliminate a landing position shift, an ejection speed is corrected.

In the flowchart illustrated in FIG. 7 and the flowcharts illustrated in FIG. 3 and FIG. 5, in steps that are the same except for the thousands place, substantially the same processing is executed, and a detailed description thereof will be omitted.

Steps S2235 and S2245 are largely different. In step S2235, the control unit 50 calculates a landing position shift correction amount (speed value) from PG, a CR speed, and an ink droplet speed, and in step S2245, causes CR operation to be performed (in consideration of the landing position shift correction amount) to eject ink.

In the above-described embodiment, the correction amount was considered for the ejection timing. Specifically, since a landing position is shifted to a forward direction side while the thickness of the transporting belt is small, timing for causing an ink droplet to be ejected at a position backward by a predetermined distance corresponds to a landing position shift correction amount. Similarly, even when an ink droplet is caused to be ejected at the same timing while the thickness of the transporting belt is small, the ink droplet can be caused to land at the same position as long as an ejection speed is low. In this way, a correction amount for changing an ejection speed for a landing position not to be shifted is a landing position shift correction amount. In step S2235 and step S2245, the control unit 50 corrects the landing position shift before the transporting belt is heated.

Note that the present disclosure is not limited to the embodiment described above. It will be obvious to those skilled in the art that mutually replaceable members, configurations, and the like disclosed in the above embodiments can be applied by appropriately changing their combinations although not disclosed in the embodiment, members, configurations, and the like that can be mutually replaced with the members, configurations, and the like disclosed in the above embodiments as known techniques are appropriately substituted, and also combinations thereof are changed and applied although not disclosed in the embodiment, those skilled in the art can appropriately substitute the members and configurations and the like that can be assumed as substitutes for the members and configurations disclosed in the above embodiments based on the known techniques and the like, and also combinations thereof are changed and applied are disclosed as embodiments of the present disclosure.

What is claimed is:

1. A printing apparatus, comprising:

a transport unit including a transporting belt formed with an adhesive layer on a surface thereof and configured to support a medium at the adhesive layer to transport the medium;

a recording unit configured to perform recording by ejecting ink onto the medium supported by the transport unit;

a heating unit configured to heat the transport unit; and a control unit configured to control the transport unit and the recording unit, wherein the control unit acquires temperature information of the transporting belt, and based on the acquired temperature information, corrects at least one of a timing at which the recording unit ejects the ink or an ejection speed.

2. The printing apparatus according to claim 1, wherein the recording unit performs recording by moving a printing head in a direction intersecting a transport direction of the medium.

3. The printing apparatus according to claim 2, wherein the recording unit performs recording by reciprocating the printing head in a direction intersecting the transport direction of the medium.

4. The printing apparatus according to claim 1, comprising a temperature detection unit configured to detect a temperature of the transport unit, wherein the control unit acquires temperature information of the transporting belt from the temperature detection unit.

5. The printing apparatus according to claim 2, wherein the control unit repeatedly executes the correction of at least one of the timing at which the ink is ejected or the ejection speed, for every printing pass of the printing head.

6. The printing apparatus according to claim 1, wherein the control unit repeats the correction of at least one of the timing at which the ink is ejected or the ejection speed, until a temperature of the transport unit reaches a predetermined temperature.

7. The printing apparatus according to claim 1, wherein the control unit acquires print start information including a print start time, and estimates, as the temperature information, a temperature of the transporting belt based on an elapsed time from the print start time.

8. The printing apparatus according to claim 1, wherein the control unit repeats the correction of at least one of the timing at which the ink is ejected or the ejection speed until the elapsed time reaches a predetermined time.

9. A printing method comprising:

including a transporting belt formed with an adhesive layer on a surface thereof, and supporting a medium at the adhesive layer to transport the medium; and heating the adhesive layer when performing recording by ejecting ink onto the supported medium, the printing method comprising:

acquiring temperature information of the transporting belt; and based on the acquired temperature information, correcting at least one of a timing at which the ink is ejected or an ejection speed.

* * * * *